United States Patent
Cook et al.

(10) Patent No.: US 11,086,390 B2
(45) Date of Patent: Aug. 10, 2021

(54) METHOD AND APPARATUS FOR IMPROVING POWER MANAGEMENT BY CONTROLLING A SYSTEM INPUT CURRENT IN A POWER SUPPLY UNIT

(71) Applicant: DELL PRODUCTS, LP, Round Rock, TX (US)

(72) Inventors: Wayne Kenneth Cook, Round Rock, TX (US); Craig Anthony Klein, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/676,982

(22) Filed: Nov. 7, 2019

(65) Prior Publication Data

US 2021/0141441 A1    May 13, 2021

(51) Int. Cl.
*G06F 1/3296* (2019.01)
*G06F 1/3206* (2019.01)
*G05B 15/02* (2006.01)

(52) U.S. Cl.
CPC .......... *G06F 1/3296* (2013.01); *G05B 15/02* (2013.01); *G06F 1/3206* (2013.01)

(58) Field of Classification Search
None
See application file for complete search history.

(56) References Cited

U.S. PATENT DOCUMENTS

| | | | |
|---|---|---|---|
| 9,261,942 B2 | 2/2016 | Breen et al. | |
| 9,760,139 B2 | 9/2017 | Chueh et al. | |
| 10,037,066 B2 | 7/2018 | Jenne et al. | |
| 10,095,293 B2 | 10/2018 | Ragupathi et al. | |
| 2007/0240017 A1* | 10/2007 | Takahashi | G11B 33/10 714/14 |
| 2012/0124406 A1* | 5/2012 | Lu | G06F 1/28 713/340 |
| 2012/0212058 A1* | 8/2012 | Buterbaugh | H02J 1/001 307/53 |
| 2015/0149792 A1* | 5/2015 | Fang | G06F 1/24 713/300 |
| 2017/0285728 A1* | 10/2017 | Huang | G06F 1/3243 |
| 2017/0322613 A1* | 11/2017 | Lin | G06F 1/3234 |
| 2019/0094936 A1 | 3/2019 | Cook et al. | |
| 2019/0148975 A1* | 5/2019 | Harris | H02J 9/04 307/66 |
| 2019/0227616 A1* | 7/2019 | Jenne | G06F 9/4401 |
| 2020/0076626 A1* | 3/2020 | Yam | H04L 43/0817 |
| 2020/0257348 A1* | 8/2020 | Wanner | G06F 1/28 |

\* cited by examiner

*Primary Examiner* — Charles E Anya
(74) *Attorney, Agent, or Firm* — Larson Newman, LLP (57) ABSTRACT

An information handling system has power supply units (PSUs), each of which includes an input over current warning (OCW) setting that provides a reference for an amount of an input current drawn by a corresponding workload. Each of the PSUs sends an interrupt to a baseboard management controller (BMC) when the amount of the input current drawn by the corresponding workload exceeds the corresponding configured input OCW setting. In response to the received interrupt, the BMC requests an adjustment to the corresponding workload.

16 Claims, 11 Drawing Sheets

| Bytes 710 | Definition 720 |
|---|---|
| 0-1 | Input OCW (Programmed Value) 722 |
| 2-3 | Input OCW (Current PSU Setting) 724 |
| 4-5 | Input OCW Maximum (Current PSU Setting) 726 |
| 6-7 | Input OCW Minimum (Current PSU Setting) 728 |

METHOD AND APPARATUS FOR IMPROVING POWER MANAGEMENT BY CONTROLLING A SYSTEM INPUT CURRENT IN A POWER SUPPLY UNIT

FIELD OF THE DISCLOSURE

This disclosure generally relates to information handling systems, and more particularly relates to improving power management by controlling a system input current in a power supply unit (PSU).

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

Power supply units (PSUs) each include an input over current warning (OCW) setting that provides a reference for an amount of an input current drawn by a corresponding workload. Each of the PSUs may send an interrupt to a baseboard management controller (BMC) when the amount of the input current drawn by the corresponding workload exceeds the corresponding configured input OCW setting. In response to the received interrupt, the BMMC requests an adjustment to the corresponding workload.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
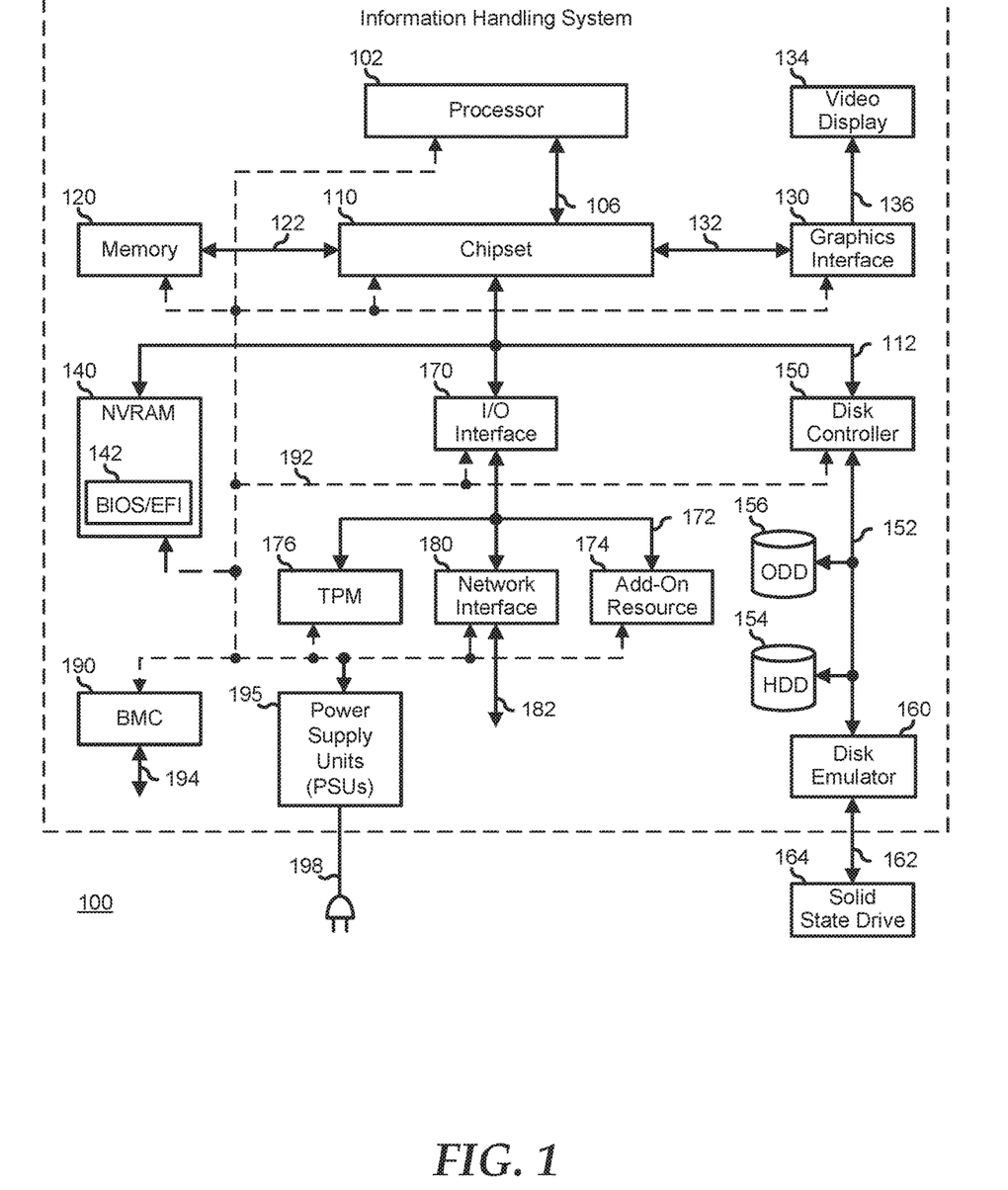
FIG. 1 is a block diagram illustrating an information handling system according to an embodiment of the present disclosure.

FIG. 1 illustrates an embodiment of an information handling system 100 including a processor 102, processor interface 106, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface 180, a baseboard management controller (BMC) 190, and power supply units (PSUs) 195 with a plug chord 198. The information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. The elements depicted in information handling system 100 may not be representative of all elements of information handling systems in general. Moreover some elements as depicted in information handling system 100 may not be applicable to all information handling systems as described in the present embodiments.

Chipset 110 represents an integrated circuit or group of integrated circuits that manages data flow between the processor 102 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disk controller to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a NIC, a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a NIC or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from the processor 102, which provides various management functions for information handling system 100. In an embodiment, BMC 190 may be responsible for granting access to an external device that may establish control of the elements to implement power management, cooling management, storage management, and the like. The BMC 190 may communicate with the external server using a network interface 194.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes the network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

PSUs 195 may include multiple power supplies to support power requirements of the information handling system. Each one of the PSUs 195 may include hardware circuitry that can provide a source of electrical energy. The hardware circuitry can supply the electrical energy to support, for example, a system workload in the information handling system. In this example, the supporting of the system workload includes providing of the biasing voltages to the processor 102, graphics interface 130, universal serial bus drive, display screen, and other information handling system component that may require electrical energy for its operation. In various embodiments, the supporting of the system workload can be distributed to different PSUs of a power network. Due to power delivery infrastructure limitations at server level or data center level by these PSUs, there is a need to control amount of current that is being drawn from each one of the PSUs so as not to overload the power network. The infrastructure limitations can be observed at a PDU level, a branch power distribution, or data center transformer.

Figure 2:
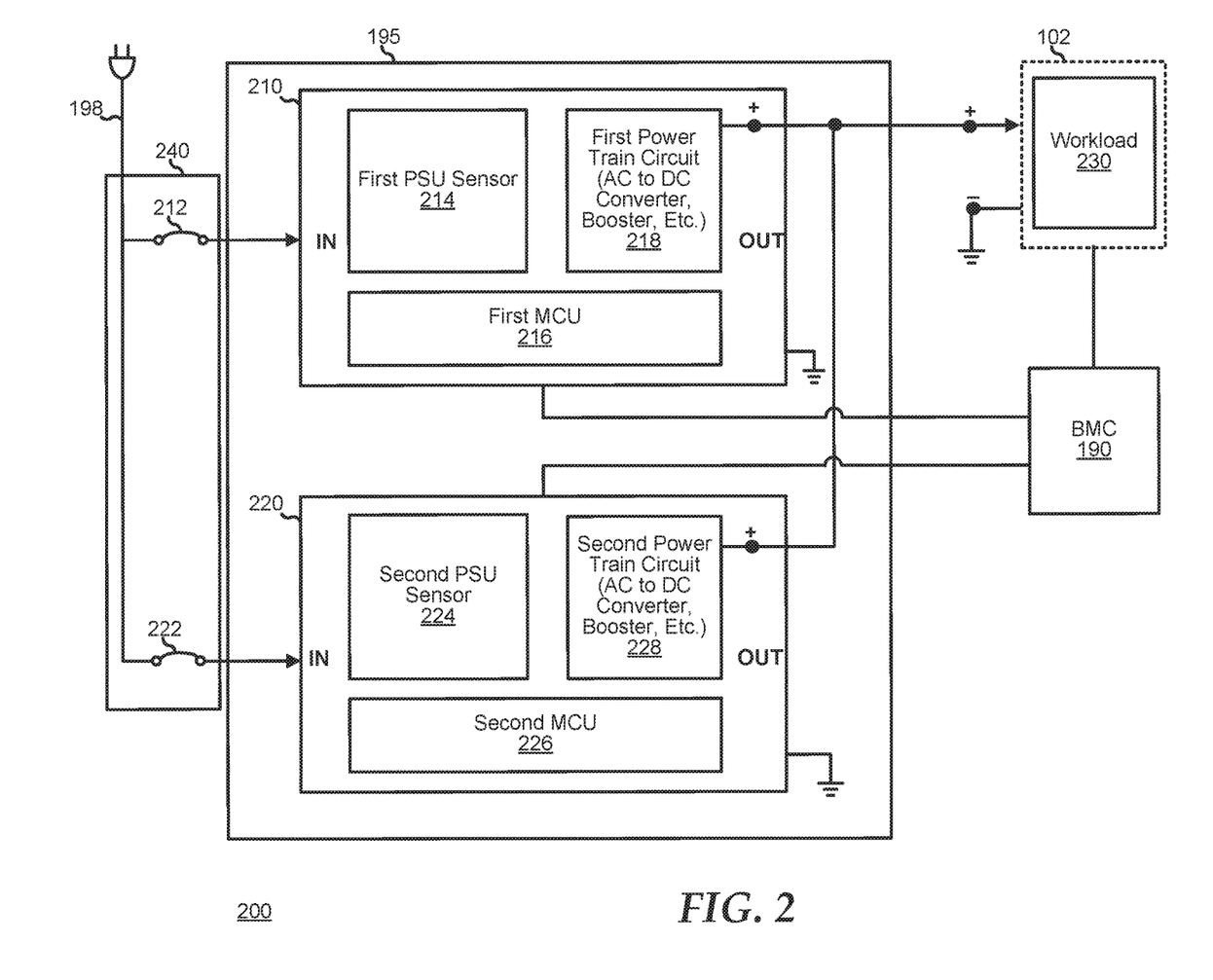
FIG. 2 is a block diagram of a portion of the information handling system configured to improve power management according to an embodiment of the present disclosure.

FIG. 2 shows a portion 200 of the information handling system. The portion 200 includes the power supply 195 including a first PSU 210 and a second PSU 220, the processor 102 with a workload 230, and the BMC 190. The first PSU 210 is connected to a first circuit breaker 212, and the first PSU includes a first PSU sensor 214, a first MCU 216, and a first power train circuit 218. The second PSU 220 is connected to a second circuit breaker 212, and the second PSU includes a second PSU sensor 224, a second MCU 226, and a second power train circuit 228. The first second circuit breaker 212 and the second circuit breaker 222 can be branches of a PDU 240. Input portions of the first PSU 210 and the second PSU 220 may receive an AC power through the PDU 240, while output portions of the first and second PSUs can be coupled to the processor 102 to support the workload 230. The BMC 190 can be connected to the first MCU 216, the second MCU 226, and the processor 102.

As an operation overview of the portion 200, the first circuit breaker 212 may serve as a first layer of protection to an input current that can be received by the first PSU 210. During a PSU operation, fluctuations in applied input voltages may occur resulting to corresponding changes in the input current at an input side of the first PSU 210. The input side of the first PSU 210 includes a stage where the input current is yet to be rectified, boosted, etc. to generate a DC voltage at an output side of the first PSU. In various embodiments, the fluctuations of the input voltages cannot be controlled. However, an amount of current to be drawn from the input current at the input side of the first PSU 210 can be managed. For example, a first input OCW setting can be configured for the first PSU 210. The first input OCW setting may include a programmed input current threshold value that can be based upon power requirements of the workload 230. In this example, when the amount of current drawn by the workload 230 is greater than the configured first input OCW setting, an interrupt is triggered and the interrupt is communicated by the first MCU 216 to the BMC 190. In response to the received interrupt, the BMC 190 may be configured to send a signal to the processor 102 to request adjustment of workload processing. The workload processing adjustments by the processor 102 may correspond to changes in power consumption for the workload and thus, can result to corresponding decrease in the amount of current that is drawn from the input current. This operation of the first PSU 210 can be implemented in the second PSU 220 to avoid a total power breakdown in the server or data center due to over loading.

The first MCU 216 includes hardware circuitry that can perform tasks related to management of the first PSU 210. For example, the first MCU 216 may include an in-system power monitoring and management (IPMM) module. In this example, the IPMM module may include storage registers and an internal processor that can execute code instructions to monitor or change a first PSU 210 line status, to monitor a line condition, and/or to determine the amount of current that can be drawn by the workload 230 from the input current. The line status includes an operational line condition of the first PSU 210 as called out in a line status register in the first MCU 216. The line condition includes real time line voltage that is being applied to the first PSU 210. The line status and the line condition are usually in alignment with each other but there are conditions when they will not be aligned. Further information on the details of the line status, line condition, monitoring of the line condition by the PSU, changing of line status and OCW settings to reflect new line conditions, issuance of change in line status command by the BMC, determination by the PSU of high-line or low-line AC input, reporting by the PSU of the high-line status or low-line status to the BMC, and the like, may be found in U.S. patent application Ser. No. 15/715,788 entitled "MANAGING THE OPERATION OF POWER SUPPLY UNITS (PSUS)," filed on Sep. 26, 2017, now U.S. Pat. No. 10,481,663, Issued Nov. 19, 2019, which is incorporated herein by reference in its entirety.

Upon activation of an input OCW setting feature of the first PSU 210, the first MCU 216 may receive a programmed value of the first input OCW setting from an end-user or the BMC 190. For example, the end-user may program the value of the first input OCW setting when additional processor cores are to be supported by the first PSU 210 for the first time. The programmed value of the first input OCW setting includes a programmed current threshold value that can be derived from the power requirements of the workload 230. The first MCU 216 may use the programmed value as default values when the line status is established through an initial application of the input voltage to the first PSU 210. In an embodiment, the first MCU 216 may further monitor any changes in the line condition that can result to changes in the programmed value of the first input OCW setting. In a case where the first MCU 326 detects no change in the line status after an occurrence of a line condition change, a new default value for the first input OCW setting may be set.

In an embodiment, the first MCU 216 may use the first PSU sensor 214 to determine the amount of current that is drawn or can be drawn by the workload 230 for a present line condition. With the determined amount of current that is drawn from the input current, the first MCU 216 may compare this amount with the programmed value of the first input OCW setting. In this embodiment, an interrupt can be triggered when the amount of current drawn by the workload 230 exceeds the programmed value of the first input OCW setting for the present line condition. The first MCU 216 can communicate the interrupt to the BMC 190 and/or the processor 102 for further processing.

In various embodiments, the workload 230 may represent an amount of computational work or tasks that the processor performs. In multi-core processors, the workload 230 may include usage rates during non-idle periods on each core. The usage rates can be based from an amount of time that the core is used to process instructions as opposed to elapsed time when the core is in idle mode. In other cases, the workload 230 may represent the power consumption by information handling system components such as video display, sound device, and the like.

The first power train circuit 218 includes hardware circuitry to convert the received electrical energy into electrical energy source that is usable by the processor 102 and other components of the information handling system. For example, the first power train circuit 218 converts 120VAC or 240VAC electrical energy into 5-12VDC source. In this example, the first power train circuit 218 may include alternating current to direct current (AC/DC) rectifier, booster, or other topologies and/or a filter circuit. In various embodiments, the programmed value of the first input OCW setting is configured in reference to the input side of the first power train circuit 218. In this case, the change in the line condition cannot be controlled. However, the amount of current to be drawn at the input side of the first power train circuit 218 can be managed by using the first input OCW setting as a reference value for the triggering of the interrupt.

The first PSU sensor 214 includes hardware circuitry that is configured to read line condition, monitor temperature of the first power train circuit 218, monitor the electrical voltage or current at the input side of the first PSU 210, and/or monitor the electrical voltage or current at the output side of the first power train circuit. In various embodiments, the first PSU sensor 214 can include a timer that may be used to monitor changes in the line condition of the first PSU 218. In this embodiment, the timer can be activated by fluctuations in the input voltage.

In various embodiments, the BMC 190 may receive the interrupt from the first MCU 216. In response to the received interrupt, the BMC 190 may send a power limit recommendation to the processor 102. The power limit recommendation may include a request to adjust power consumption in the workload 230. In this embodiment, the adjustments in the workload 230 may generate corresponding changes in the power drawn by the processor 102. The changes in the power drawn by the processor 102 may correspond to adjustments in discharging rate of the first PSU 210. In this regard, the discharging rate of the first PSU 210 may be indirectly adjusted by the BMC 190 based on the received interrupt from the first MCU 216. Furthermore, the adjustments in the discharging rate may indicate management of the input current of the first PSU 210.

The operation of the second PSU 220 is similar to the first PSU 210. In various embodiments, the workload 230 may be distributed between the first PSU 210 and the second PSU 220. For example, the first PSU 210 and the second PSU 220 are operating at a high-line and a low-line AC input, respectively. In this example, the workload 230 can be divided between the two PSUs. In this embodiment, the end-user can program different values for the first input OCW setting and a second input OCW setting. The second input OCW setting for the second PSU 220 may include the programmed current threshold value that can be based upon power requirements of the assigned workload.

Figure 3:
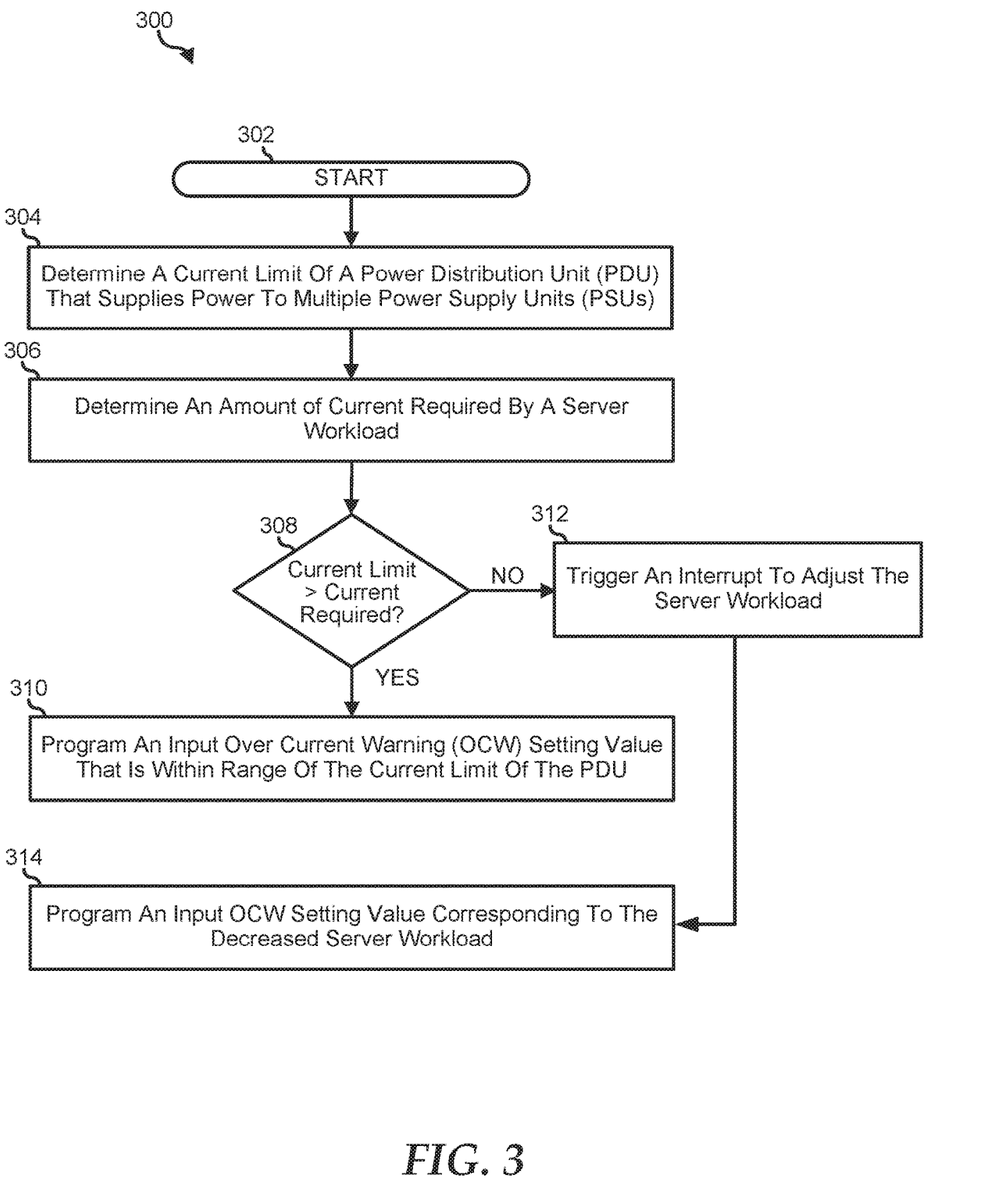
FIG. 3 is a flow chart showing a method of configuring an input over current warning (OCW) setting at a power distribution unit (PDU) level according to an embodiment of the present disclosure.

FIG. 3 shows a method 300 of programming a value of the input OCW setting based upon a maximum current limit of the PDU 240 that supplies electrical energy to the PSUs 195, starting at block 302. At block 304, determine a current limit of the PDU that supplies power to multiple PSUs. For example, the PDU 240 includes the first circuit breaker 212 and the second circuit breaker 222 that are connected to the first PSU 210 and the second PSU 220, respectively. Assuming that each one of the first and second circuit breakers includes a current limit of 50 A, then the PDU 240 can support a maximum current limit of 100 A for its main breaker circuit. At block 306, determine an amount of current that is required to support a server workload is performed. For example, the total amount of current requirements is based upon amount of total power that is required to support the server workload. In this example, the server workload can include amount of computational work that the processor performs, the power consumption of server components such as video display, sound device, and the like.

At block 308, the MCU compares the determined current limit of the PDU with the determined total amount of current that is required to support the server workload. Typically, a nominal value of the determined current limit of the PDU is utilized for comparison with the total amount of current requirements of the server workload. In a case where the total amount of current requirements by the server workload is within the nominal value of the PDU, then at block 310, an end-user can safely program an input OCW setting value that is within range of the current limit of the PDU. Otherwise, at block 312, the MCU triggers and sends an interrupt to the BMC 190 that facilitates adjustment of the server workload. After the adjustment of the server workload, and at block 314, the value of the input OCW setting can be programmed based upon the amount of current that may be required by the adjusted server workload.

Figure 4:
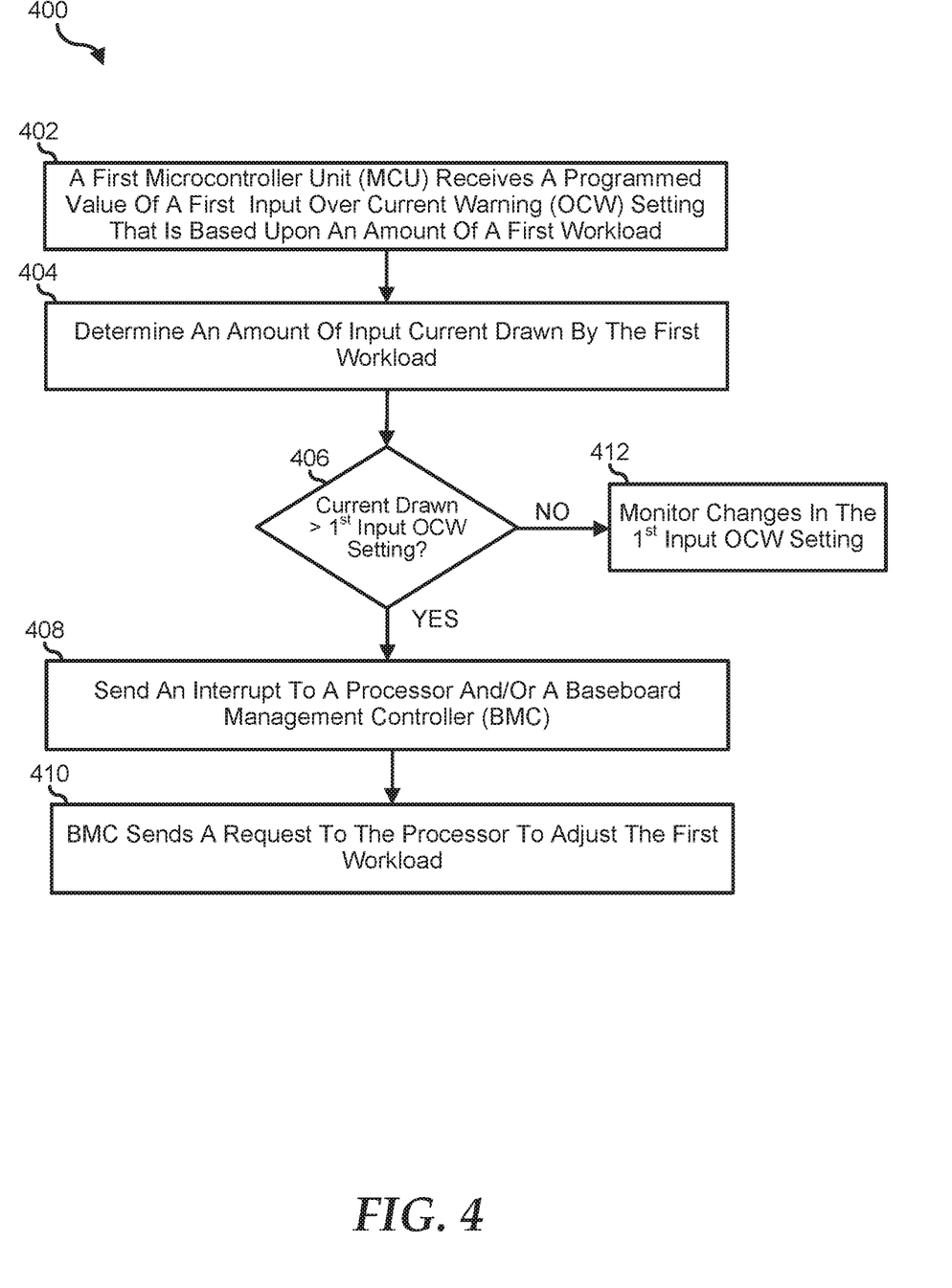
FIG. 4 is a flow chart showing a method of configuring the input OCW setting at a power supply unit (PSU) level according to an embodiment of the present disclosure.

FIG. 4 shows a method 400 of programming a first input OCW setting value for the first PSU when different PSUs are configured to support different workloads in the information handling system. At block 402, a first MCU of the first PSU receives a programmed value of a first input OCW setting based upon an amount of power that is required to support a first workload. For example, the first PSU 210 supports the first workload that includes computational tasks that are performed by a portion of the workload 230. In this example, the end-user can configure the first input OCW setting based upon current requirements of the first workload.

At block 404, the first MCU determines an amount of the input current that is drawn by the first workload. At block 406, the first MCU compares the determined amount of input current drawn by the first workload with the programmed value of the first input OCW setting. In a case where the amount of input current drawn is greater than the programmed value of the first input OCW setting, then at block 408, the first MCU sends an interrupt to the processor 102 and/or the BMC 190. At block 410, the BMC sends a request to the processor to adjust the first workload.

In a case where the amount of input current drawn is lesser than the first input OCW setting at block 406, then at block 412, the first MCU may continue monitoring any changes in the first input OCW setting. In other embodiments, the first MCU compares the determined amount of the input current that can be drawn by the first workload rather than the real time amount of current drawn during PSU operation.

Figure 5:
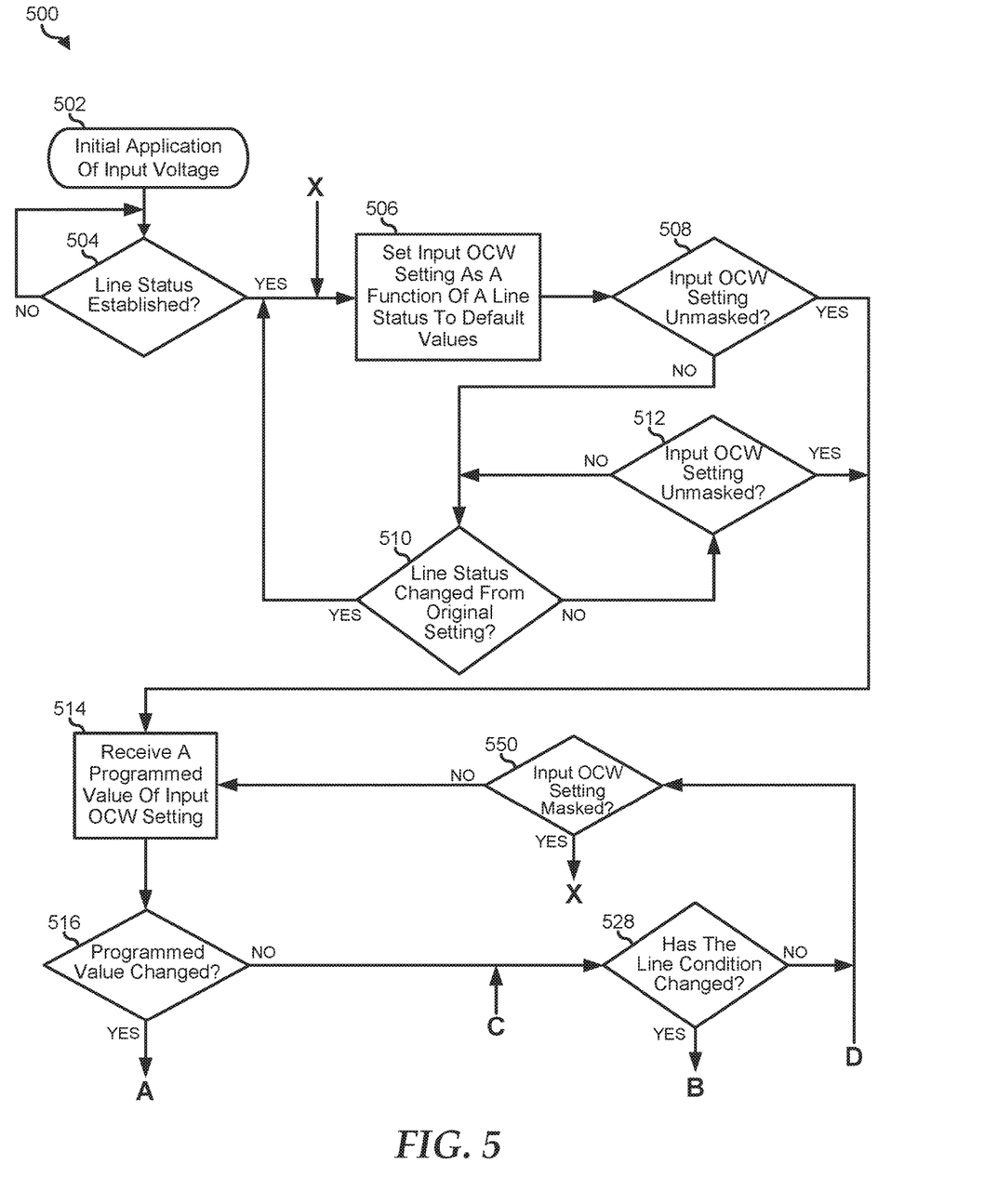
FIGS. 5-6 are flow charts showing a method of managing a PSU operation to update the input OCW setting in a microcontroller unit (MCU) register according to an embodiment of the present disclosure.
Figure 6:
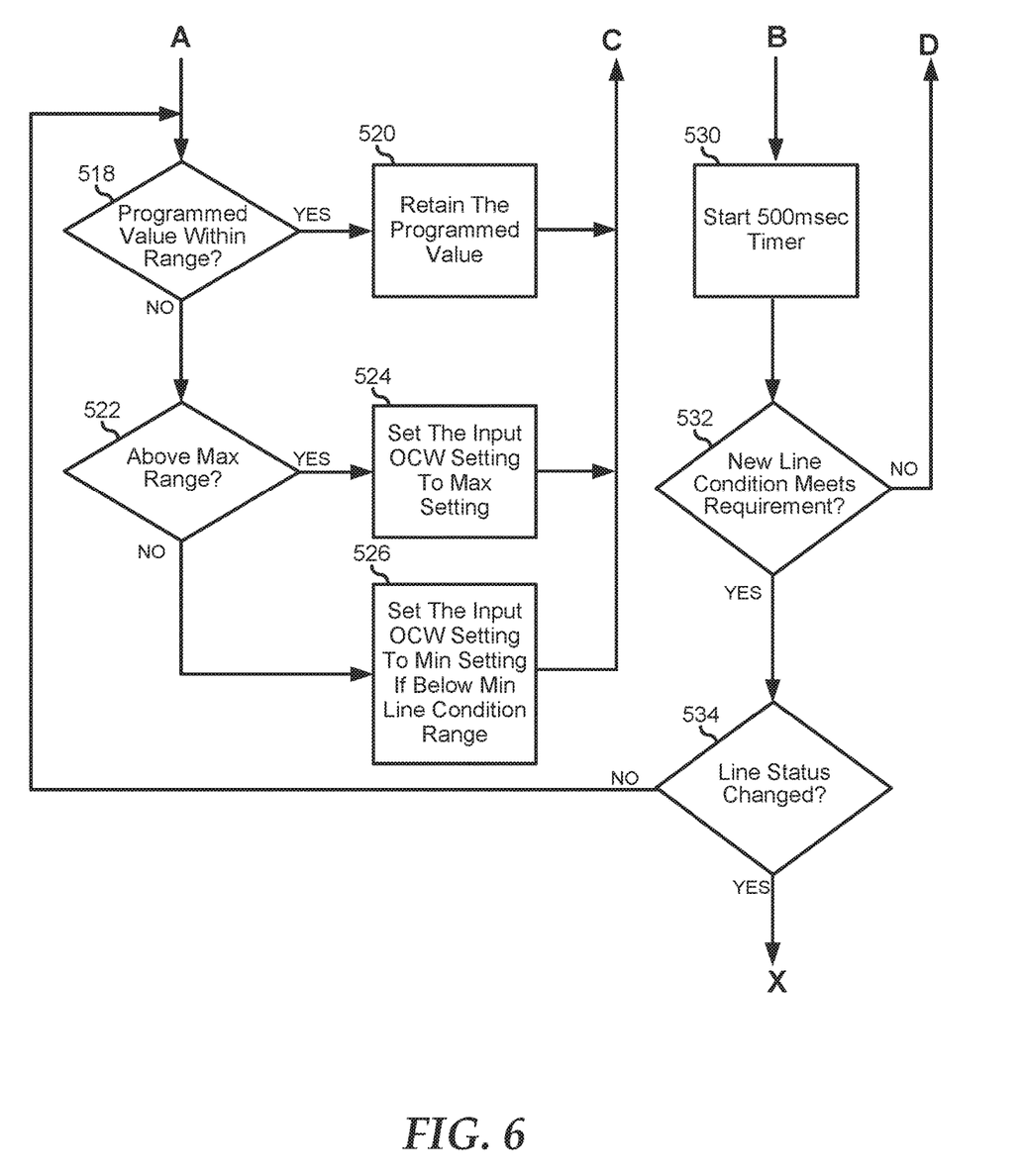

FIGS. 5-6 show a method 500 for managing the operation of the PSUs. For example, the method 500 may be used for programming the value of the input OCW setting, and for configuring the input OCW setting as a function of line status. At block 502, an application or re-application of an input voltage to the PSU's input line is performed. For example, the plug chord 198 is plugged to an AC wall socket in order to provide an AC power source to the PSU.

At block 504, the MCU determines whether the line status has been established. The line status is established when the MCU register reflects default power capabilities. If the line status has been established, then at block 506, default values of the input OCW setting can be stored in the MCU register including the following: end-user programmed value which is initially the default value for the established line status; actual input OCW set point; maximum allowable OCW set point; and minimum allowable OCW set point.

If the end-user does not enable the input OCW setting at block 508, then at block 510, the PSU remains in a loop waiting for a change in the initial setting of the MCU register. For example and in case of a line status change at block 510, then the PSU may reload the MCU register with new default values for that line voltage. Otherwise, the PSU remains in the loop waiting for the end-user to unmasks the input OCW setting at block 512. To unmask the input OCW setting includes enabling of the OCW feature of the PSU.

If the end-user enables the input OCW setting at block 508, then at block 514, the MCU can receive a programmed value of the input OCW setting. The programming can be initiated by the end-user or the BMC 190 may send the programmed value to the MCU. The range in which the end-user can make changes to the values at block 506 can be controlled by the maximum and minimum settings established by the current line status.

At block 516, the MCU determines whether there is a change in the programmed value of the input OCW setting. That is, the MCU looks to the default values in the MCU register and compare the received programmed value at block 514. If there is a change in the programmed value, then at block 518, the MCU determines whether the programmed value is within maximum and minimum line condition range. If it is within the maximum and minimum line condition ranges, then at block 520, the MCU retains the received programmed value at block 514 as the current input OCW setting. In this case, the current input OCW setting will be reflected in the MCU register. Otherwise, and at block 522, the MCU determines whether the received programmed value at block 514 is above the maximum line condition range. If the programmed value is above the maximum line condition range, then at block 524, the MCU sets the current input OCW setting to the maximum setting for the line condition. If the programmed value is below the minimum line condition range, then at block 526, the MCU sets the current input OCW setting to the minimum setting for the line condition.

In an embodiment, the MCU register may record the new programmed value and the corresponding line status may show either the maximum setting or the minimum setting. In this embodiment, the line status can have two default conditions such as nominal voltage ranges and extended voltage ranges. The nominal voltage range includes >=197.5V for high-line and >=95V for low-line. The extended voltage range includes <=197.5V for High-line and <=95V for low-line.

Going back to block 516 and in a case where there is no change in the programmed value, then at block 528, the MCU monitors and determines whether there is a change in the line condition. The line condition is the real time input voltage at the input side of the PSU. If there is a change in the line condition, then at block 530, the MCU activates, for example, a timer such as a 500 msec timer. At block 532 and after expiration of the 500 msec period, the MCU determines whether the new line condition remained at the same line condition. If the new line condition remains the same, then the new line condition meets the requirement. In this case and at block 534, the MCU determines whether there is a change in the line status.

If there is a change in the line status, then the process loops back to the block 506. Otherwise, the input OCW setting will be fed for processing by block 518. Returning to block 532 and if the new line condition does not meet the requirement after 500 msec, then at block 550, the MCU determines whether the input OCW has been disabled. If the input OCW is disabled, then the process loops back to the block 506. Otherwise and at block 518, the received programmed value at block 514 will be compared to the maximum and minimum line condition range.

In various embodiments, the MCU may utilize the updated input OCW setting as the reference for the sending of the interrupt to the BMC 190. In this case, adjustment in the workload is performed to change the amount of current that is drawn or can be drawn from the input current of the PSU.

Figure 7:
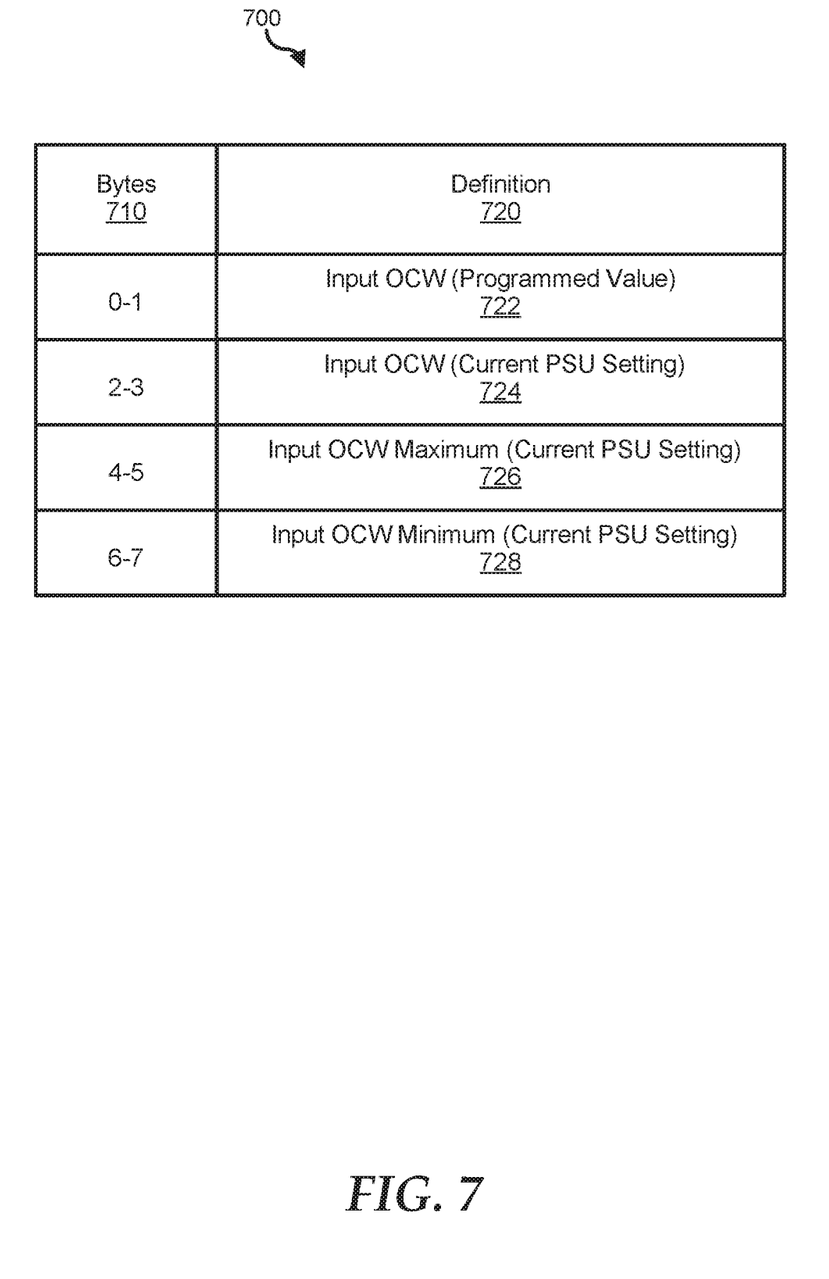
FIG. 7 is a block diagram illustrating an exemplary OCW register according to an embodiment of the present disclosure.

FIG. 7 shows an exemplary OCW register status 700 that can be used by the MCU to program the input OCW setting. The OCW register status 700 can include bytes 710 and corresponding definition 720. The bytes 0-1 may represent a programmed value 722, bytes 2-3 may represent a current input OCW setting 724, bytes 4-5 may represent an input OCW maximum setting 726, and bytes 6-7 may represent an input OCW minimum setting 728. The MCU can read or write on the bytes 0-1, while the rest of the bytes are read-only bytes.

The programmed value 722 may include the input OCW setting default value after the power supply has established its line status. The current input OCW setting 724 in most cases will be the same value as programmed value 722. An exception would be when the line status changes after the 500 msec time period and the programmed value is now outside of the new range for that line condition. In this case, either the minimum or the maximum value of the new range will be set.

The input OCW maximum setting 726 includes the maximum allowable programmed value which corresponds to the operational line voltage condition. The maximum over current value is called out in parametric electrical specification which is typically at ≤95Vac, ≤197.5Vac, ≥192Vdc or ≥40Vdc. The input OCW minimum setting 728 may include the minimum allowable programmed value which corresponds to the operational line voltage condition. The minimum set point is the greater of 25% of the Input OCW maximum or 1A.

Figure 8:
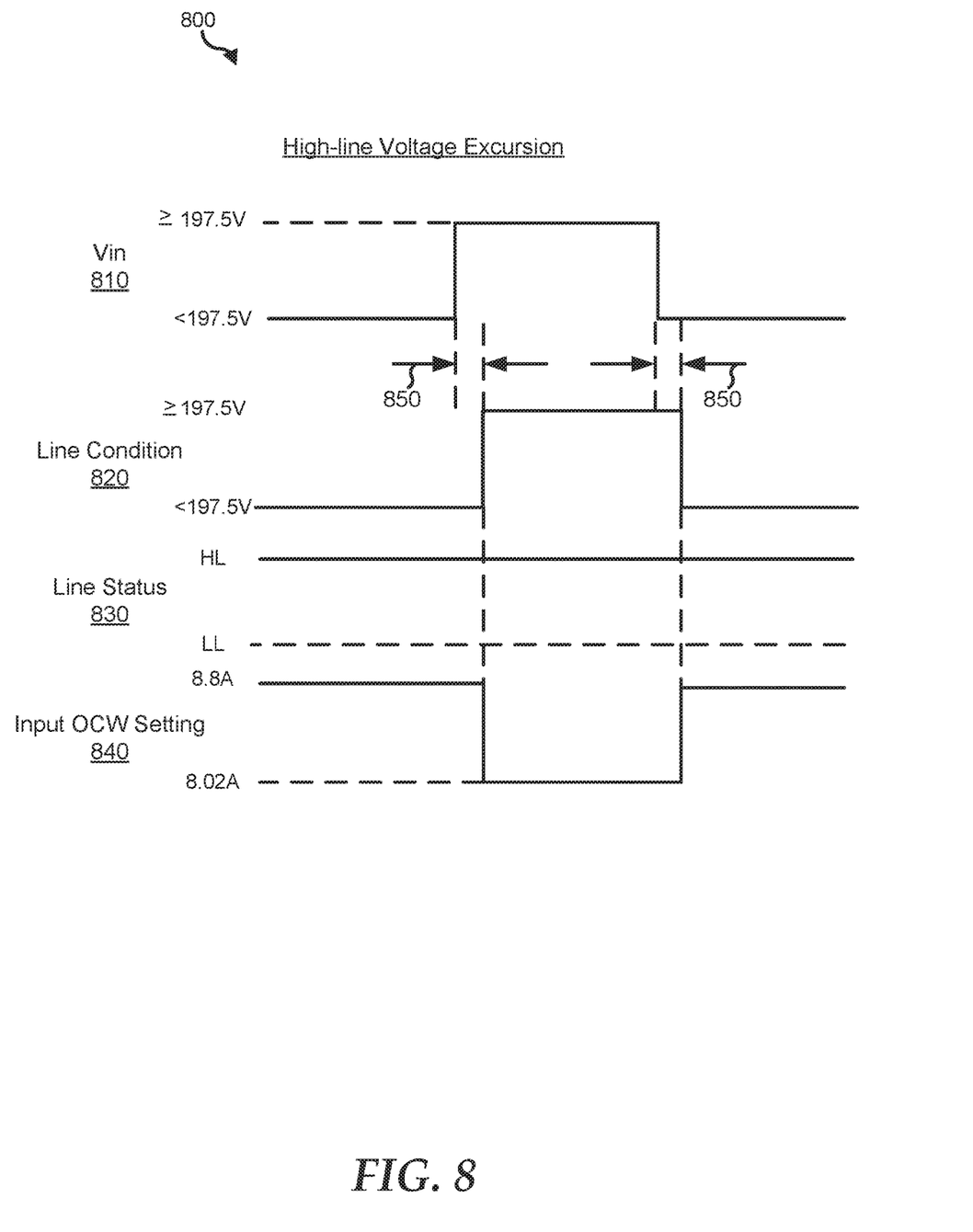
FIG. 8 is a graph of configuring the input OCW setting during a high-line voltage excursion in the PSU according to an embodiment of the present disclosure.

FIG. 8 is a graph 800 of a high-line voltage excursion in the PSU. The graph 800 includes an input voltage 810, a line condition 820, a line status 830, an input OCW setting 840, and a first time period 850. In various embodiments, the input voltage 810 can include two different maximum input current default values for a high line PSU as a function of its operating voltage. Once the input voltage 810 transitions from one state to another such as when the input voltage changes from <197.5V to >197.5V, a timer is initiated to run the first time period 850. For example, the first time period 850 includes 500 msec time period. In a case where the input voltage remains at this new state at the lapse of the 500 msec time period, the input OCW setting 840 may default to the new value of that state. An exception would be if the input OCW setting was set at a lower value than the default state value. In this case, there would be no change in the input OCW setting. The input OCW setting may include the lower of the maximum default value for the high line condition or the programed value.

Figure 9:
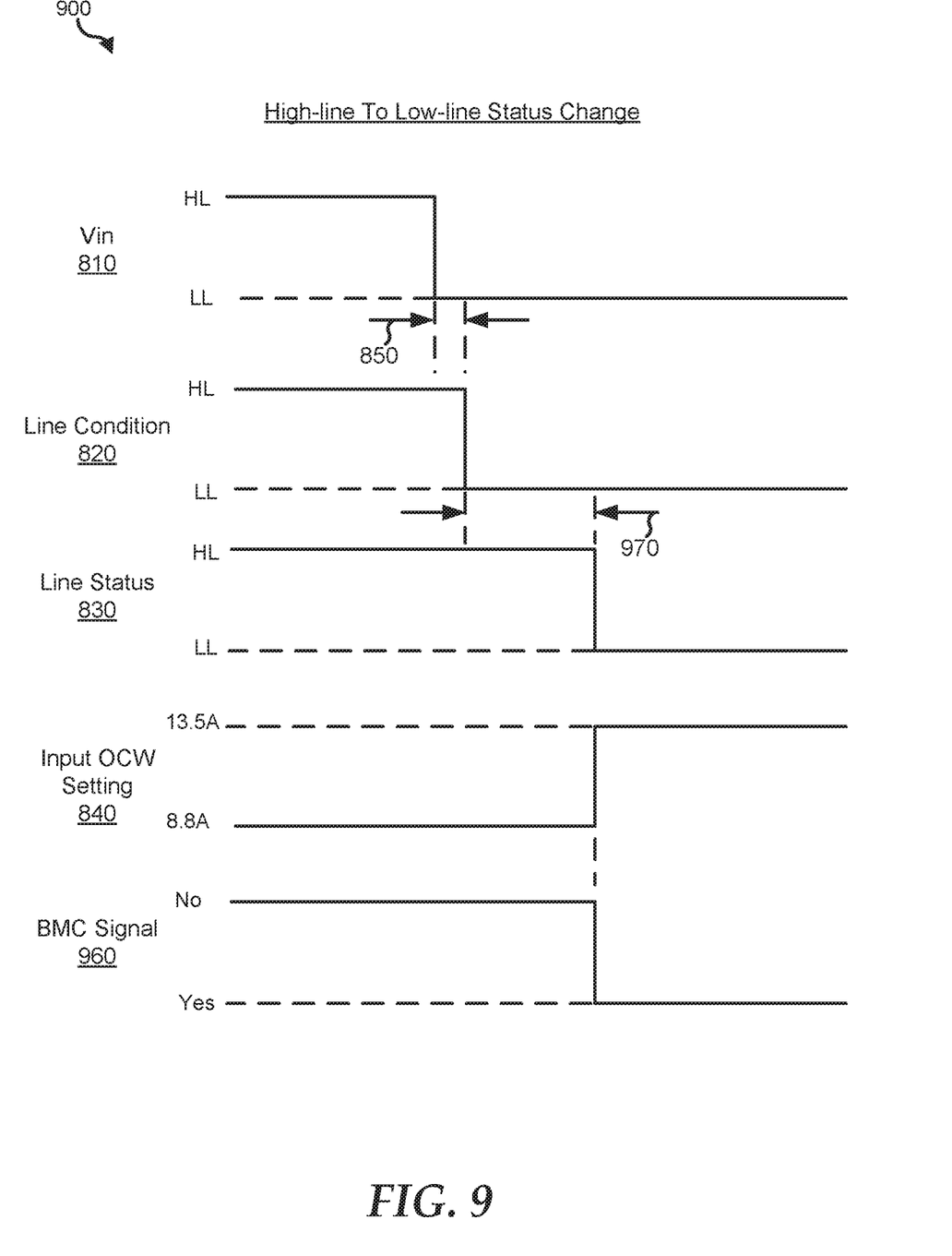
FIG. 9 is a graph of configuring the input OCW setting during a high-line to a low-line status change in the PSU according to an embodiment of the present disclosure.

FIG. 9 is a graph 900 showing the PSU transitioning from a high-line to a low-line power supply. The graph 900 includes the input voltage 810, line condition 820, line status 830, input OCW setting 840, first time period 850, a BMC signal 960, and a second time period 970. The BMC signal 960 can include a command from the BMC that instructs the MCU to proceed with the change in line status. The second time period 970 may include a time period that is controlled by the BMC 190. For example, the line condition 820 follows the change in input voltage 810 at the end of the first time period 850. In this example, the period of time between the end of the first time period 850 and the sending of the BMC signal includes the second time period 970.

In various embodiments, the input voltage 810 may fluctuate and drops from high-line to low-line. In this case, the drop triggers running of the first time period 850. For example, the first time period 850 is configured to include about 10 seconds. At the end of the first time period 850 and the input voltage remains in the low-line, the MCU may inform the BMC of its new input voltage condition. In an embodiment, the BMC 190 may control the length of the second time period 970 where the line status 830 remains at high-line status. That is, the BMC controls the status of the PSU to remain as high-line power supply or low-line power supply. In this embodiment and at the end of the second time period 970, the MCU may receive the BMC signal 960 and the MCU proceeds with the change in the input OCW setting 840. The input OCW setting 840 can now be set to its new default condition for the line voltage.

Figure 10:
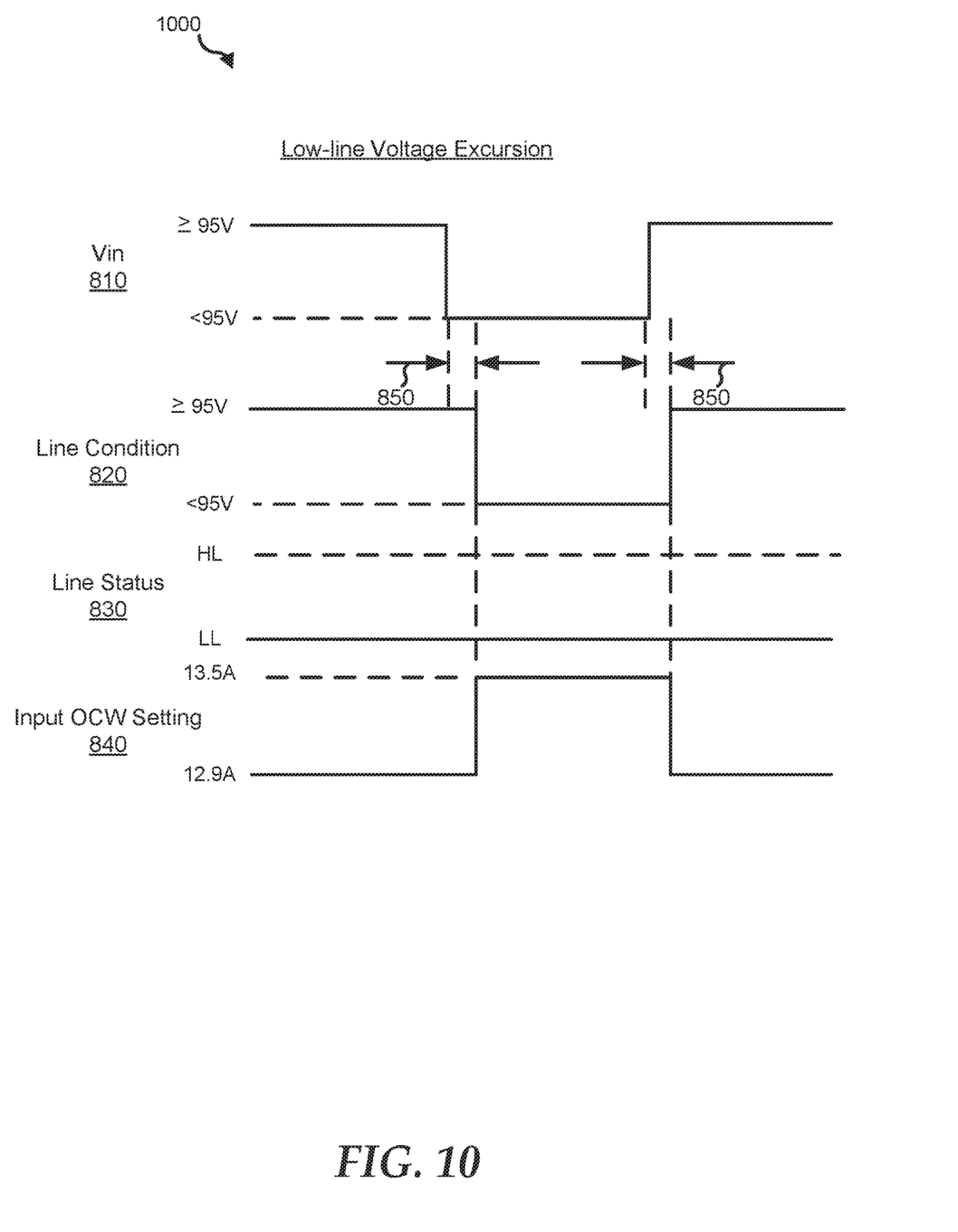
FIG. 10 is a graph of configuring the input OCW setting during a low-line voltage excursion in the PSU according to an embodiment of the present disclosure.

FIG. 10 is a graph 1000 of a low-line voltage excursion in the PSU. The graph 1000 includes the input voltage 810, line condition 820, line status 830, input OCW setting 840, and the first time period 850. In various embodiments, the input voltage 810 can include two different maximum input current default values for a low-line PSU as a function of its operating voltage. Once the input voltage 810 transitions from one state to another such as when the input voltage changes from >95V to <95V, a timer is initiated to run the first time period 850. For example, the first time period 850 includes 500 msec time period. In a case where the input voltage remains at this new state at the lapse of the 500 msec time period, the input OCW setting 840 may default to the new value of that state. An exception would be if the input OCW setting was set at a lower value than the default state value. In this case, there would be no change in the input OCW setting. The input OCW setting may include the lower of the maximum default value for the low line condition or the programed value.

Figure 11:
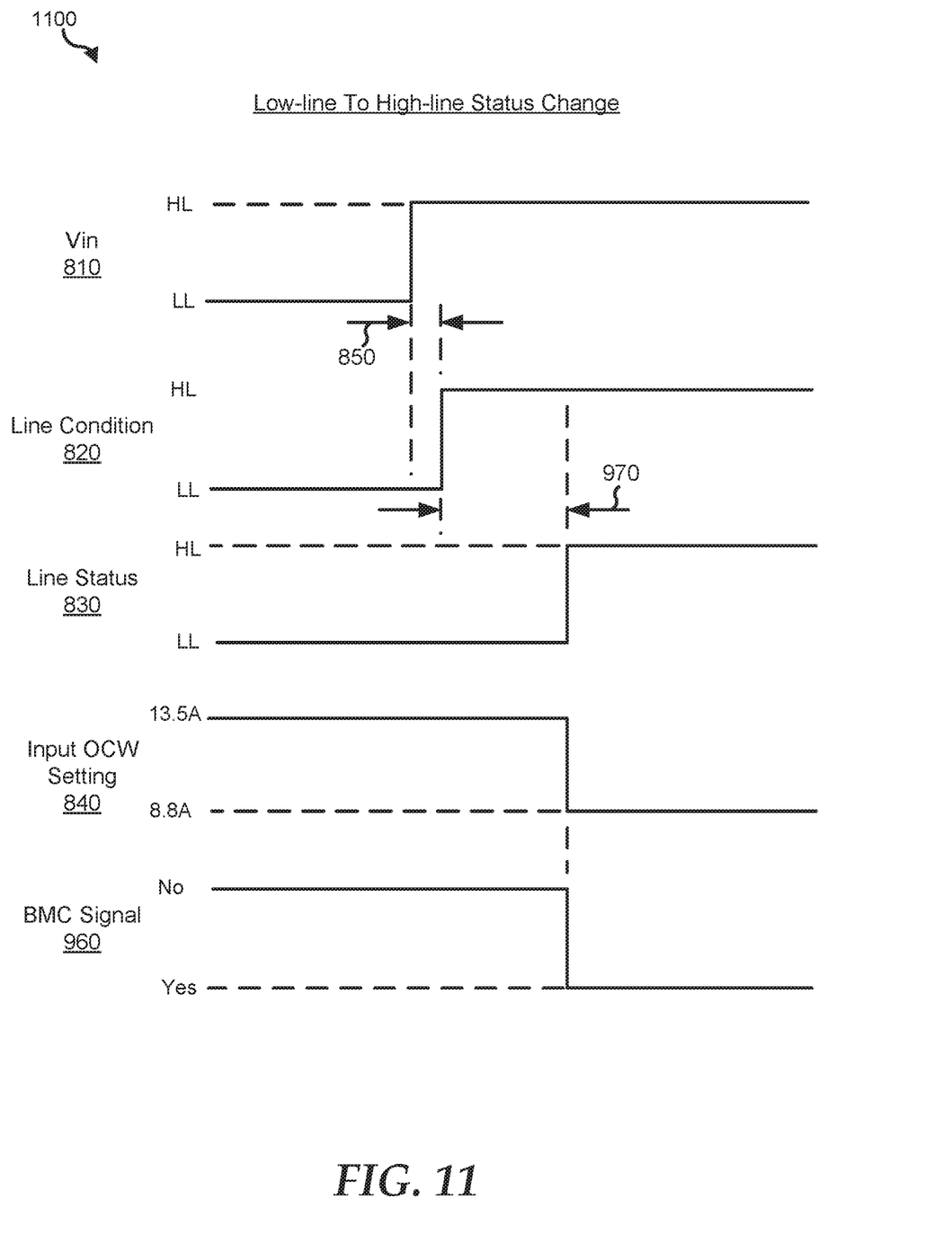
FIG. 11 is a graph of configuring the input OCW setting during a low-line to high-line status change in the PSU according to an embodiment of the present disclosure.

FIG. 11 is a graph 1100 showing the PSU transitioning from a low-line to a high-line power supply. In various embodiments, the input voltage 810 may fluctuate from low-line to high-line. In this case, the increase triggers running of the first time period 850. For example, the first time period 850 is configured to include about 10 seconds. At the end of the first time period 850 and the input voltage remains in the high-line, the MCU may inform the BMC of its new input voltage condition. In an embodiment, the BMC 190 may control the length of the second time period 970 where the line status 830 remains at low-line status. That is, the BMC controls the status of the PSU to remain as high-line power supply or low-line power supply. In this embodiment and at the end of the second time period 970, the MCU may receive the BMC signal 960 and the MCU proceeds with the change in the input OCW setting 840. The input OCW setting 840 can now be set to its new default condition for the line voltage.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various I/O devices, such as a keyboard, a mouse, and a video display. Information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system having improved power management, comprising:
   a processor;
   a baseboard management controller (BMC) coupled to the processor, the BMC to determine a power requirement for a workload, and to set a programmed value based on the determined power requirement;
   a plurality of power supply units (PSUs) including first and second PSUs coupled to the processor and to the BMC, wherein the workload is divided between the first and second PSUs, wherein the first PSU includes a first input over current warning (OCW) setting that provides a first reference for a first amount of an input current drawn by a first portion of the workload assigned to the first PSU, wherein a first portion of the programmed value is included in the first OCW setting based on the first portion of the workload assigned to the first PSU, wherein the second PSU includes a second input OCW setting that provides a second reference for a second amount of the input current drawn by a second portion of the workload assigned to the second PSU, wherein a second portion of the programmed value is included in the second OCW setting based on the second portion of the workload assigned to the second PSU; and a micro controller unit (MCU) to program the value of the input OCW, wherein the program of the value of the input OCW includes the MCU to:

determine whether a line status has been established;

when a MCU register reflects default power capabilities and in response to the line status having been established, the MCU to store default values of the input OCW in the MCU register, and to reload the MCU register with new default values based on a change in the line status, wherein the first PSU sends a first interrupt to the BMC when the amount of the input current drawn by the first portion of the workload exceeds the configured first input OCW setting, and in response to the received first interrupt, the BMC requests the processor to adjust the workload.

2. The information handling system of claim 1, wherein each of the PSUs is configured to: monitor a change in a line condition; to inform the BMC of the change in a line condition; and to receive a signal from the BMC to change the input OCW setting based upon the detected change in the line condition.

3. The information handling system of claim 2, wherein the monitoring of the change in the line condition utilizes a first time period.

4. The information handling system of claim 3, wherein the first time period includes 500 milliseconds.

5. The information handling system of claim 1, wherein each of the PSUs is configured to compare the programmed value of the input OCW setting with an input OCW maximum value, and to set the input OCW setting to include the input OCW maximum value when the programmed value is greater than the input OCW maximum value.

6. The information handling system of claim 1, wherein each of the PSUs includes the MCU register that sets default values of the input OCW setting upon an application of an input voltage to the PSU.

7. The information handling system of claim 1, wherein the adjustment in the corresponding workload decreases the first input current drawn from an input side of the first PSU.

8. An information handling system, comprising:

a baseboard management controller (BMC) coupled to a processor, the BMC to determine a power requirement for a workload, and to set the programmed value based on the determined power requirement;

a plurality of power supply units (PSUs) including first and second PSUs coupled to the processor and to the BMC, wherein the workload is divided between the first and second PSUs, wherein the first PSU includes a first portion of the programmed value of an input over current warning (OCW) setting that provides a first reference for a first portion amount of an input current drawn by a first portion of the workload assigned to the first PSU, wherein the second PSU includes a second input OCW setting that provides a second reference for a second amount of the input current drawn by a second portion of the workload assigned to the second PSU, wherein a second portion of the programmed value is included in the second OCW setting based on the second portion of the workload assigned to the second PSU; and a micro controller unit (MCU) to program the value of the input OCW, wherein the program of the value of the input OCW includes the MCU to:

determine whether a line status has been established;

when a MCU register reflects default power capabilities and in response to the line status having been established, the MCU to store default values of the input OCW in the MCU register, and toreload the MCU register with new default values based on a change in the line status, wherein the first PSU sends a first interrupt to the BMC when the amount of the input current drawn by the first portion of the workload exceeds the first portion of the programmed value of the input OCW setting, and wherein in response to the received interrupt, the BMC requests the processor to adjust the workload.

9. The information handling system of claim 8, wherein each of the PSUs is configured to: monitor a change in a line condition; to inform the BMC of the change in a line condition; and to receive a signal from the BMC to change the input OCW setting based upon the detected change in the line condition.

10. The information handling system of claim 9, wherein the monitoring of the change in the line condition utilizes a first time period.

11. The information handling system of claim 10, wherein the first time period includes 500 milliseconds.

12. The information handling system of claim 8, wherein each of the PSUs is configured to compare the programmed value of the input OCW setting with an input OCW maximum value, and to set the input OCW setting to include the input OCW maximum value when the programmed value is greater than the input OCW maximum value.

13. The information handling system of claim 8, wherein each of the PSUs includes the MCU register that sets default values of the input OCW setting upon an application of an input voltage to the PSU.

14. A method, comprising:

determining a power requirement for a workload;

setting a programmed value for an over current warning (OCW) based on the determined power requirement;

dividing the workload between first and second power supply units (PSUs);

receiving, by the first PSU, a first portion of the programmed value of the input OCW setting, wherein the first portion of the programmed value is based on a first portion of the workload assigned to the first PSU;

determining a first amount of input current drawn by the first portion of the workload;

receiving, by the second PSU, a second portion of the programmed value of the input OCW setting, wherein the second portion of the programmed value is based on a second portion of the workload assigned to the second PSU;

comparing the first portion of the programmed threshold value with the determined first amount of input current drawn by the first portion of the workload;

programming, by a micro controller unit (MCU), the value of the input OCW, wherein the program of the value of the input OCW includes:

determining whether a line status has been established;

when a MCU register reflects default power capabilities and in response to the line status having been established:

storing default values of the input OCW in the MCU register, and reloading the MCU register with new default values based on a change in the line status; and sending an interrupt to a baseboard management controller (BMC) when the first amount of input current drawn by the first portion of the workload exceeds the first portion of the programmed value of the input OCW setting, wherein in response to the received interrupt, the BMC requests a processor to adjust the workload.

15. The method of claim 14 further comprising:

monitoring, by the first PSU, a change in a line condition;

informing the BMC of the change in the line condition; and receiving a signal from the BMC to change the input OCW setting based upon the detected change in the line condition.

16. The method of claim 15, wherein the first PSU changes line status upon receiving of the signal from the BMC.

* * * * *